United States Patent
Spies et al.

(10) Patent No.: US 10,841,090 B2
(45) Date of Patent: Nov. 17, 2020

(54) PLAINTEXTS ENCRYPTED WITH PLURALITIES OF KEYS

(71) Applicant: ENTIT SOFTWARE LLC, Sanford, NC (US)

(72) Inventors: Terence Spies, Cupertino, CA (US); Karl Reiner Kappenberger, Cupertino, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 151 days.

(21) Appl. No.: 16/083,668

(22) PCT Filed: Mar. 18, 2016

(86) PCT No.: PCT/US2016/023254
§ 371 (c)(1),
(2) Date: Sep. 10, 2018

(87) PCT Pub. No.: WO2017/160316
PCT Pub. Date: Sep. 21, 2017

(65) Prior Publication Data
US 2019/0074969 A1 Mar. 7, 2019

(51) Int. Cl.
*H04L 29/06* (2006.01)
*H04L 9/16* (2006.01)
*G06F 21/62* (2013.01)
*G09C 1/00* (2006.01)
*H04L 9/06* (2006.01)

(52) U.S. Cl.
CPC .......... *H04L 9/16* (2013.01); *G06F 21/6218* (2013.01); *G09C 1/00* (2013.01); *H04L 9/0618* (2013.01)

(58) Field of Classification Search
CPC ........... H04L 9/16; H04L 9/0618; G09C 1/00
USPC .......................................................... 380/28
See application file for complete search history.

(56) References Cited

U.S. PATENT DOCUMENTS

| | | | |
|---|---|---|---|
| 5,982,897 | A | 11/1999 | Clark |
| 7,233,282 | B2 | 6/2007 | Yule et al. |
| 8,208,627 | B2 | 6/2012 | Pauker et al. |
| 8,775,805 | B2 | 7/2014 | Von et al. |
| 2006/0224894 | A1 | 10/2006 | Srinivasa et al. |
| 2009/0259588 | A1* | 10/2009 | Lindsay ............... G06Q 20/102 705/40 |
| 2010/0095130 | A1* | 4/2010 | Bertran ............ G06Q 20/35765 713/189 |

(Continued)

OTHER PUBLICATIONS

International Searching Authority., International Search Report and Written Opinion dated Dec. 14, 2016 for PCT Application No. PCT/US2016/023254 Filed Mar. 18, 2016, 15 pages.

(Continued)

*Primary Examiner* — Evans Desrosiers (57) ABSTRACT

Examples discussed herein disclose, among other things, an encrypting device. The encrypting device may include a key engine to obtain a first key associated with a first access level, and a second key associated with a second access level. The encrypting device may also include a multi-key encryption engine to encrypt a first portion of the plaintext with the first key, and encrypt a second portion of the plaintext with the second key, where the first portion may include more detailed information than the second portion, and where the first access level may be higher than the second access level.

15 Claims, 5 Drawing Sheets

(56) References Cited

U.S. PATENT DOCUMENTS

| | | |
|---|---|---|
| 2011/0040797 A1 | 2/2011 | Haskell et al. |
| 2011/0182419 A1* | 7/2011 | Coomer ................ H04L 9/0662 380/28 |
| 2011/0280394 A1 | 11/2011 | Hoover |
| 2013/0073868 A1 | 3/2013 | Forlenza et al. |
| 2014/0089204 A1 | 3/2014 | Spies et al. |
| 2014/0304825 A1 | 10/2014 | Gianniotis et al. |
| 2015/0248568 A1 | 9/2015 | Offenberg et al. |

OTHER PUBLICATIONS

Liechti, M., et al., Format Preserving Encryption, Bern University of Applied Sciences, Bachelor Thesis, Dec. 6, 2015, 81 pages.

* cited by examiner

PLAINTEXTS ENCRYPTED WITH PLURALITIES OF KEYS

BACKGROUND

Some data systems may be accessed by users having different access levels. In such systems, some data may be accessible to some users (e.g., users having higher access levels), but not to other users (e.g., users having lower access levels). In some systems, data may be made inaccessible to some users by encrypting the data with an encryption key unknown to those users. For example, an original string of characters ("a plaintext") may be encrypted using a particular encryption key to produce an encrypted string of characters ("a ciphertext").

Some systems may encrypt the plaintext using format-preserving encryption may be used, where the resulting ciphertext has the same length as the plaintext and does not include characters outside of the character domain of the plaintext. The character domain may be defined as any specific set of characters, such as all numerical characters, all alphabetical characters, all alphanumerical characters, etc. Encrypting the plaintext using format-preserving encryption may allow a system that was designed to process (e.g., display, store, etc.) plaintexts to also process ciphertexts without a need to redesign the system.

BRIEF DESCRIPTION OF THE DRAWINGS

The following detailed description references the drawings, wherein.

DETAILED DESCRIPTION

As mentioned above, in some systems, data may be accessible to some users but not to other users. However, completely denying access to some users and giving full access to other users may not always be an adequate approach. For example, in some systems, some users may be allowed to have "partial" access to certain data. For example, a user may not have permissions to see the exact value of a particular data entry, but may have permissions to see that entry's approximate value.

Accordingly, some examples discussed below describe systems and methods that may allow a particular user to access some portions of a given data, such as portions associated with lower degree of detail or resolution, while denying that user access to other portions of the given data, such as portions associated with higher degree of detail or resolution. For example, for numerical data that stores the highest resolution information in its least significant bits (e.g., geographic coordinates, currency amounts, internet protocol (IP) addresses, credit card or bank account numbers), the described systems and methods may allow a particular user to access a certain number of most significant bits of the data, while denying that user access to other, less significant, data bits. Similarly, for numerical data that stores higher resolution information in its most significant bits (e.g., dates stored in DD/MM/YYYY format) the described systems and methods may allow a particular user to access a certain number of the least significant bits of the data, while denying access to all other bits. And for data whose highest resolution bits are stored somewhere in the middle of the data entry (e.g., dates stored in MM/DD/YYYY format) the described systems and methods may allow a particular user to access a particular range of bits within the data (e.g., bits 16-31 in a 48-bit entry) and deny the user access to other bits (e.g., bits 0-15 and 32-47).

Some examples discussed below describe an encrypting device. The encrypting device may include a key engine to obtain a first key associated with a first access level, and a second key associated with a second access level. The encrypting device may also include a multi-key encryption engine to encrypt a first portion of the plaintext with the first key, and encrypt a second portion of the plaintext with the second key, where the first portion may include more detailed information than the second portion, and where the first access level may be higher than the second access level.

Figure 1:
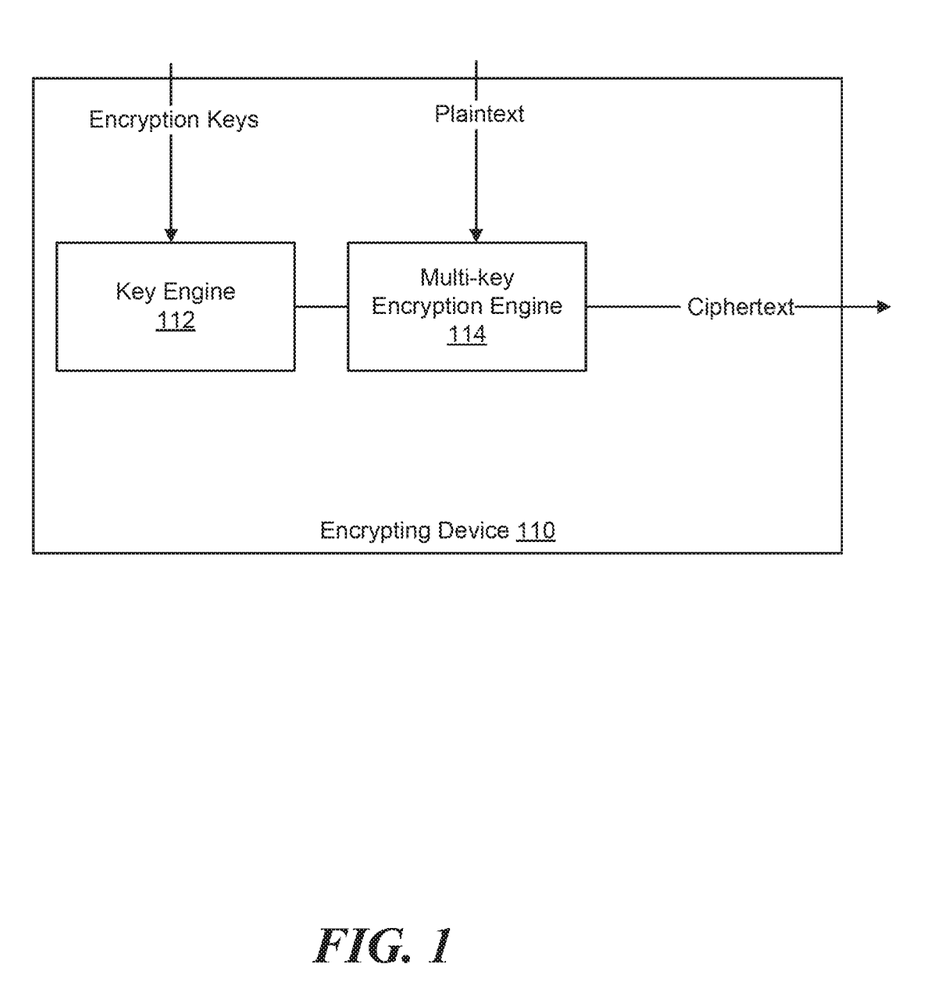
FIG. 1 is a block diagram of an example encrypting device.

FIG. 1 shows an example encrypting device 110. Encrypting device 110 may include any type of electronic device suitable for performing the functionality discussed herein. For example, encrypting device 110 be a smartphone, a computer of any kind (e.g., a laptop, a desktop computer, a server, and so forth), a network device, a gaming device, a home appliance, or any other type of electronic device or equipment. In some examples, encrypting device 110 may include a combination of any number of electronic devices or engines that together may implement the functionality of encrypting device 110 described herein. Encrypting device 110 may generally represent any combination of hardware and programming.

As illustrated in FIG. 1, encrypting device 110 may include, among other things, a key engine 112 and a multi-key encryption engine 114, each of which may generally represent any combination of hardware and programming that may be embedded in encrypting device 110 or communicatively coupled thereto. In some examples, key engine 112 and multi-key encryption engine 114 may be separate engines, while in other examples, that the functionality of the two engines may be implemented in a single engine, or distributed over any number of communicatively coupled engines.

As illustrated in some of the following examples, key engine 112 may obtain a plurality of keys associated with different access levels. For example, key engine 112 may obtain a first key associated with a first access level and a second key associated with a second access level, where the first access level is higher than the second access level. As used herein "higher" access levels refer to levels that allows users to access higher-detail or higher-resolution portions of data than "lower" access levels. Accordingly, a higher access level may correspond, for example, to a user's higher security clearance, special administrator's rights, and so forth. After key engine 112 obtains the plurality of keys, it may provide the keys to multi-key encryption engine 114, which may obtain a plaintext and use the plurality of keys to encrypt the plaintext and to produce a ciphertext, as will be further illustrated below.

Figure 2:
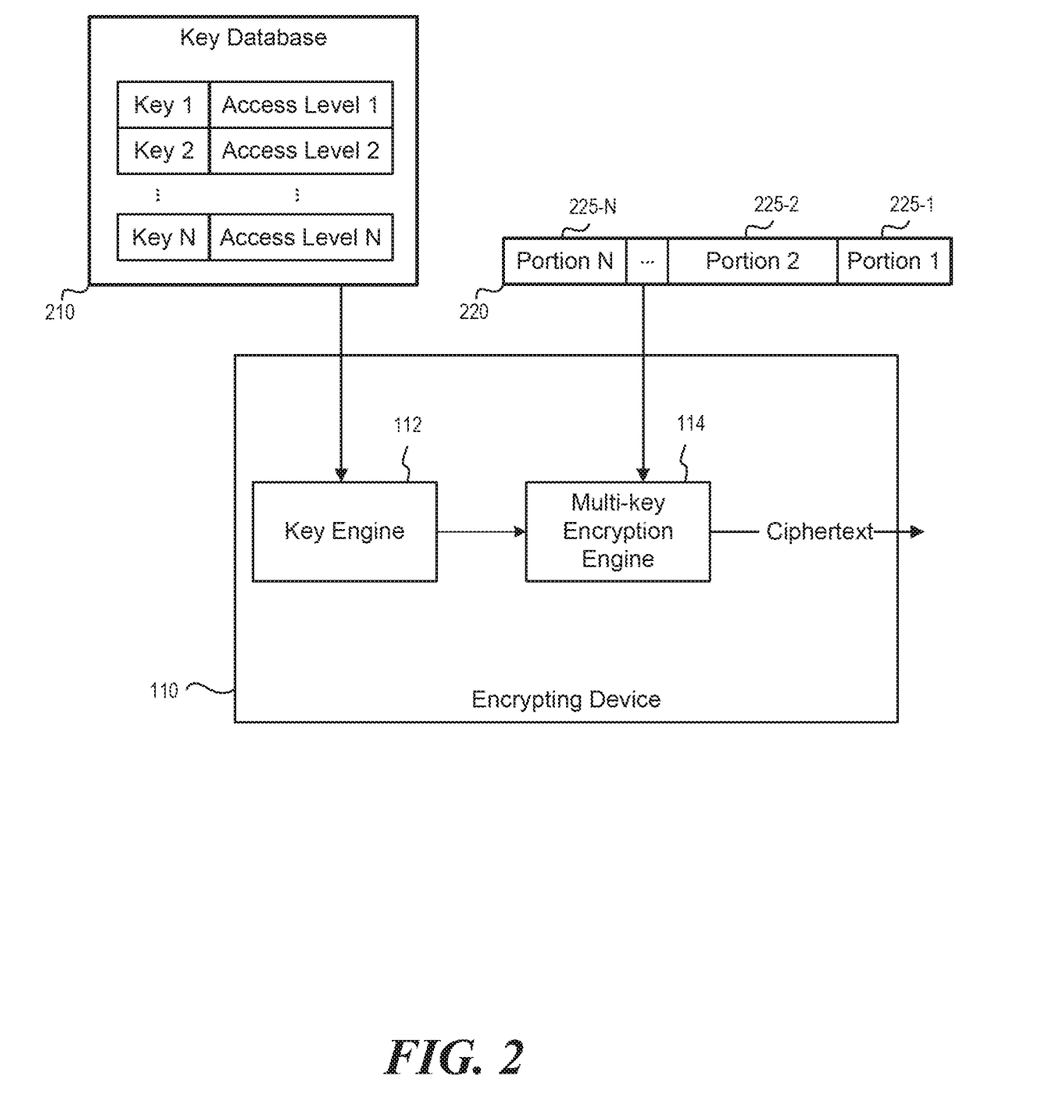
FIG. 2 is another block diagram of an example encrypting device.

In some examples, key engine 112 may obtain the plurality of keys from a key database, such as key database 210 shown in FIG. 2. Key database 210 may be stored on encrypting device 110, or on a remote device communicatively coupled to encrypting device 110, e.g., via one or more networks such as the Internet. Key database 210 may store a plurality of (i.e., two or more) encryption keys, hereinafter referred to as "keys" for brevity. In some examples, each key may be associated with a different access level. In the example shown in FIG. 2, key 1 is associated with access level 1, key 2 is associated with access level 2, and so on.

In the example illustrated in FIG. 2, multi-key encryption engine 114 obtains a plaintext 220. Plaintext 220 may be obtained, for example, from a memory or a user input device (e.g., a physical or virtual keyboard) that may be included in or otherwise coupled to encrypting device 110. The obtained plaintext may include any number of characters, and in some examples, all characters in the plaintext may be associated with (e.g., included in) a particular character domain, as discussed above.

In some examples, plaintext 220 may be physically or virtually divided into a plurality of portions (shown in FIG. 2 as portions 225-1, 225-2, . . . 225-N), and multi-key encryption engine 114 may process the obtained plaintext one portion at a time. The number of portions, as well as the size and the location of each portion, may be predefined. The size and location may be defined in units of characters, bytes, bits, or any other suitable unit of data. For example, a first portion may be defined as the portion that includes K least significant characters, bytes, or bits; another portion may be defined as the portion that includes L most significant characters, bytes, or bits; yet another portion may be defined as the portion that includes a M characters, bytes or bits, starting from P's character, byte, or bit; and so forth, where K, L, M, and P are predefined constants.

In some examples, different portions may have different lengths. In other examples, all portions may be of the same length. Specifically, in some examples, each portion may consist of one character, meaning that engine 114 may process the plaintext one character at a time. Furthermore, while in some examples illustrated herein the portions do not overlap, in other examples some or all portions may partially or fully overlap.

As mentioned above, each portion may be associated with a different level of detail, also referred to herein as a different "degree of resolution" or a different "degree of granularity." For example, if the plaintext includes a geographic coordinate (e.g., a longitude or a latitude) represented by a number or a string containing numeric characters, then portions having more significant bits can be associated with a lower level of detail than portions having less significant bits. In this example, the least significant bit(s) may contain the most detailed information, i.e., information associated with the highest degree of resolution or granularity, and the most significant bit(s) may contain the least detailed information, i.e., information associated with the lowest degree of resolution or granularity.

After determining the different portions of the plaintext (or after "dividing" the plaintext into the different portions) based on predefined portion sizes and locations, multi-key encryption engine 114 may encrypt each portion using a different key. As discussed above, multi-key encryption engine 114 may obtain the plurality of different keys from key engine 112. In some examples, multi-key encryption engine 114 may encrypt the portions in accordance with the level of detail associated with each portion and in accordance with the access level associated with each key. Specifically, in some examples, engine 114 may encrypt portions associated with lower levels of detail using keys associated with lower access levels, and encrypt portions associated with higher level of detail using keys associated with higher access levels. That is, each portion of the plaintext may be encrypted using a key associated with an access level that corresponds to (e.g., is in direct relation) to the level of detail associated with the portion.

In some examples, engine 114 may encrypt the plaintext using a plurality of iterations, where a different key is used for encryption at each iteration. That is, at each next iteration, engine 114 uses a next key to encrypt a next portion. In some examples, at each iteration, engine 114 encrypts only the corresponding portion and does not encrypt any other portions. For example, if the plaintext includes portions A, B, C, and D, engine 114 may, at the first iteration, encrypt portion A with a first key to produce an encrypted portion $A^1$; at the second iteration encrypt portion B with a second key to produce an encrypted portion $B^2$; at the third iteration encrypt portion C with a third key to produce an encrypted portion $C^3$; and at the fourth iteration encrypt portion D with a fourth key to produce an encrypted portion $D^4$. In these examples, engine 114 may process the portions in any order.

In other examples, at each iteration starting from the second iteration, engine 114 may use the next key to encrypt not only the next portion, but also the result of the encryption of the preceding iteration. For example, if the plaintext includes portions A, B, C, and D, engine 114 may, at the first iteration, encrypt portion A with a first key to produce an encrypted portion $A^1$. At the second iteration, engine 114 may encrypt with a second key portions B and $A^1$ to produce portions $B^2$ and $A^{1,2}$, meaning that portion A has now been encrypted twice: first with a first key and then with a second key. Similarly, at the third iteration engine 114 may use a third key to produce portions $C^3$, $B^{2,3}$, and $A^{1,2,3}$, and at the fourth iteration, engine 114 may use a fourth key to produce portions $D^4$, $C^{3,4}$, $B^{2,3,4}$, and $A^{1,2,3,4}$. In these examples, engine 114 may process the portions in accordance with the level of detail associated with the portions, and therefore also in accordance with the access level associated with the keys being used to encrypt the portions. Specifically, in some examples, engine 114 may start processing the portions from a portion associated with the highest level of detail, and proceed in accordance with a decreasing level of detail (and a decreasing level of access level), where the portion associated with the lowest level of detail is processed last.

In some examples, before encrypting each portion, engine 114 determines a randomizer (also referred to as an initialization vector or a tweak) and uses the randomizer to randomize the encryption, such that two identical portions encrypted with the same key do not necessarily produce the same result when encrypted. In some examples, engine 114 may determine the randomizer based on other portions of the plaintext. If other portions of the plaintext have already been encrypted, engine 114 may use the encrypted versions of the portions or the original versions of the portions for determining the randomizer. If engine 114 determines the randomizer based on the encrypted versions of the portions, engine 114 may encrypt the portions in accordance with a predefined order.

In some examples, at least one portion of the plaintext may remain unencrypted, meaning that the resulting ciphertext may include at least one portion that has not been encrypted or otherwise altered. In some examples, the portion that may remain unencrypted is a portion associated with the lowest level of detail, such as a portion including the most significant bits of a geographic coordinate.

Figure 3:
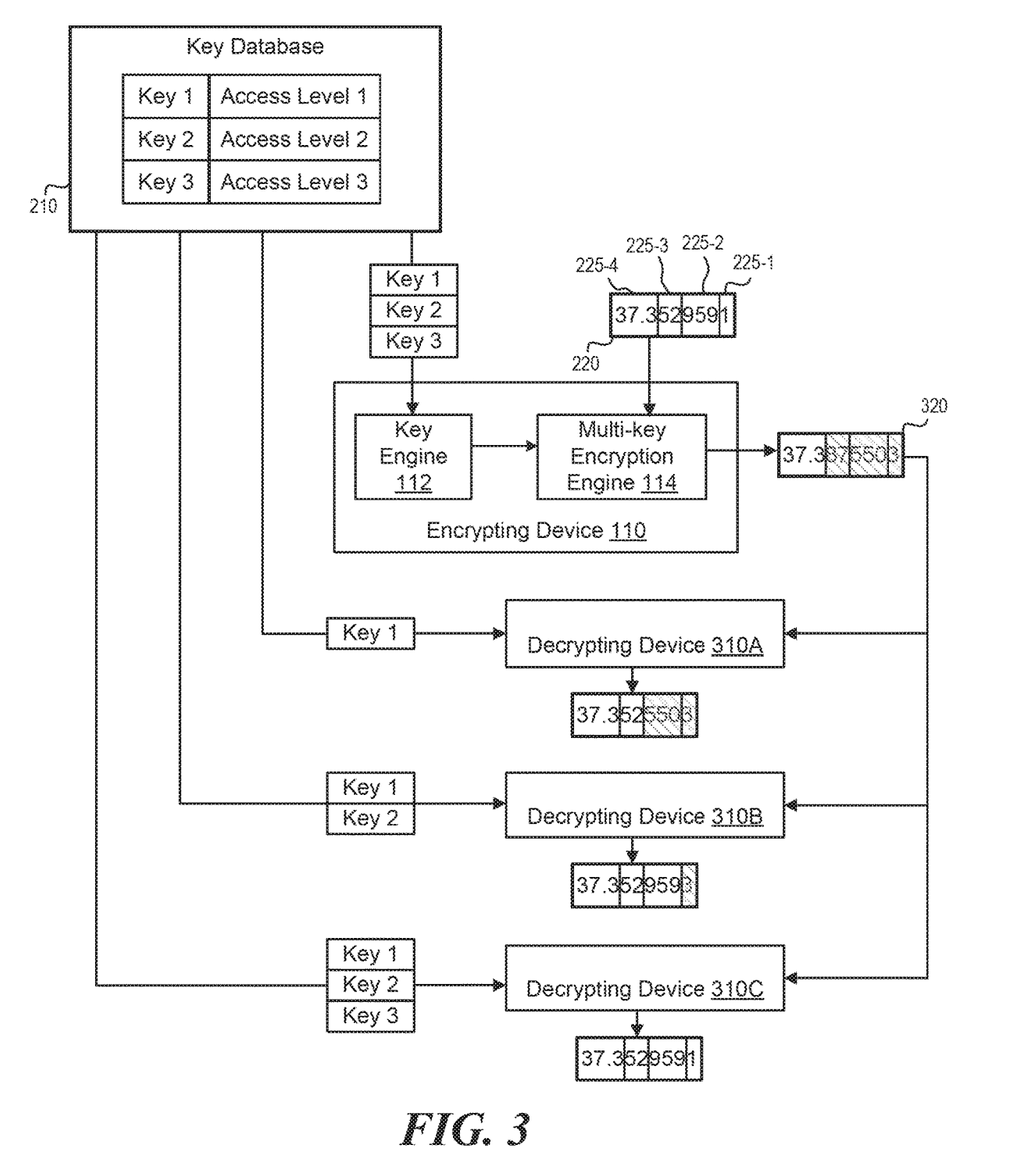
FIG. 3 is a block diagram of an example encrypting device and example decrypting devices.

In the example illustrated in FIG. 3, engine 114 obtains plaintext 220 that includes a geographic coordinate 37.3529591, and engine 112 obtains from key database 210 and provides to engine 114 three keys referred to as Key 1, Key 2, and Key 3. In this example, Key 1 is associated with the lowest access level (Access Level 1); Key 2 is associated with a medium access level (Access Level 2); and Key 3 is associated with the highest access level (Access Level 3).

In the example of FIG. 3, engine 114 divides plaintext 220 into four portions 225-1, 225-2, 225-3, and 225-4 having predefined sizes and locations within the plaintext. In this example, portion 225-4 includes the least detailed information, i.e., information associated with the lowest degree of resolution or granularity; portion 225-3 is associated with a higher degree of resolution or granularity; portion 225-2 is associated with a further higher degree of resolution or granularity; and portion 225-1 is associated with the highest degree of resolution or granularity. Accordingly, as described above, in this example, engine 114 encrypts portion 225-1 (having the value "1") with Key 3 to produce value "3"; encrypts portion 225-2 (having the value "959" with Key 2 to produce value "550"; and encrypts portion 225-3 (having the value "52" with Key 1 to produce value "87." In this example, portion 225-4 that is associated with the lowest degree of resolution or granularity is left unencrypted and is therefore accessible (e.g., visible) to everyone, including users that don't have access to any of the keys.

After encrypting all portions except portion 225-4 (where each portion is encrypted individually or together with previously encrypted portions, as discussed above) engine 114 may produce and output ciphertext 320. Ciphertext 320 may then be displayed, stored in a memory, sent to another engine or another device (e.g., via one or more networks such as the Internet), and/or otherwise processed.

In the example of FIG. 3, ciphertext 320 is sent and delivered to three decrypting devices 310A, 310B, and 310C, each of which may be any type of electronic device suitable for performing the functionality discussed herein. For example, decrypting devices 310A, 310B, and 310C may be smartphones, computers of any kind (e.g., laptops, desktop computers, servers, and so forth), network devices, gaming devices, home appliances, or devices of any other type. Each decrypting device 310 may generally represent any combination of hardware and programming.

As illustrated in the example of FIG. 3, decrypting devices 310A, 310B, and 310C may access key database 210. In other examples, decrypting devices 310A, 310B, and 310C may instead access another database (or other databases) storing the same keys in association with the same access levels. Each decrypting device 310 may obtain from key database 210 a set of keys, where the set of key is determined based on the access level of a user that is currently associated with decrypting device 310, such as a user that is currently using the services of the particular decrypting device 310. Thus, depending on the access level of the user associated with decrypting device 310, decrypting device 310 may be able to obtain a set of zero keys, a set of one key, a set of some but not all keys used to produce ciphertext 320, or a set comprising all keys that were used to produce ciphertext 320.

The access level of the user may be determined by decrypting device 310, for example, based on user's authentication input and/or based on user database storing access level information for various users. It is appreciated that the same decrypting device 310 may be associated with different users having different access levels, and therefore may obtain different sets of keys depending on which user is currently being associated with decrypting device 310 (e.g., which user is currently running a process that employs decrypting device 310 for decrypting ciphertext 320). Thus, in some examples, decrypting devices 310A, 310B, and 310C may represent different instances of the same device running processes associated with different users having different access levels.

In some examples, a particular decrypting device 310 may obtain from key database 210 any keys that are associated in key database 210 with an access level that is equal or lower than the access level of the user associated with the particular decrypting device 310. To illustrate using the example of FIG. 3, for a user having Access Level 1 (e.g., the user of decrypting device 310A) the obtained set of keys would include one key—Key 1; for a user having Access Level 2 (e.g., the user of decrypting device 310B) the obtained set of keys would include two keys—Key 1 and Key 2; and for a user having Access Level 3 (e.g., the user of decrypting device 310C) the obtained set of keys would include three keys—Key 1, Key 2, and Key 3.

After obtaining the set of keys corresponding to the access level of its user, each decrypting device 310 can use the set of keys to decrypt ciphertext 320. Each decrypting device 310 may employ a decryption method that corresponds to the encryption method used by encrypting device 110. Thus, each decrypting device 310 may divide ciphertext 320 into the same predefined portions that were used by encrypting device 110 (or into corresponding portions if the encryption was not format preserving and the length of the portions have changed). Similarly, if encrypting device 110 encrypted the portions using a particular predefined order, each decrypting device 310 may decrypt the portions in an order that is the opposite to that predefined order.

Accordingly, in the example of FIG. 3, decrypting device 310A can use Key 1 to decrypt one of the portions of ciphertext 320 (the portion corresponding to portion 225-3 of plaintext 220), but it cannot decrypt other portions of ciphertext 320 because its user does not have access to Key 2 and Key 3. Accordingly, the user of decrypting device 310A can see original portion 225-4 which was not encrypted, and original portion 225-3 which was decrypted, but cannot see the real original values of portions 225-1 and 225-2. Similarly, the user of decrypting device 310B can see original portion 225-4 and decrypted portions 225-3 and 225-2, but cannot see the real original values of portion 225-1. Finally, the access level of the user of decrypting device 310C in this example was high enough to allow decrypting device 310C to obtain all three keys and to fully decrypt ciphertext 320. While not shown in FIG. 3 for brevity, it is appreciated that users having access levels lower than Access Level 1 (e.g., users having Access Level 0) or users whose decrypting devices 310 for various reasons could not access key database 210, could not obtain any of the keys stored in key database 210. Such users may only be able to see the original portion 225-4, which remained unencrypted, but cannot see any other portion of the original plaintext 220.

In the foregoing discussion, various devices and engines (e.g., 110, 112, 114, and 310) were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices.

The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 4:
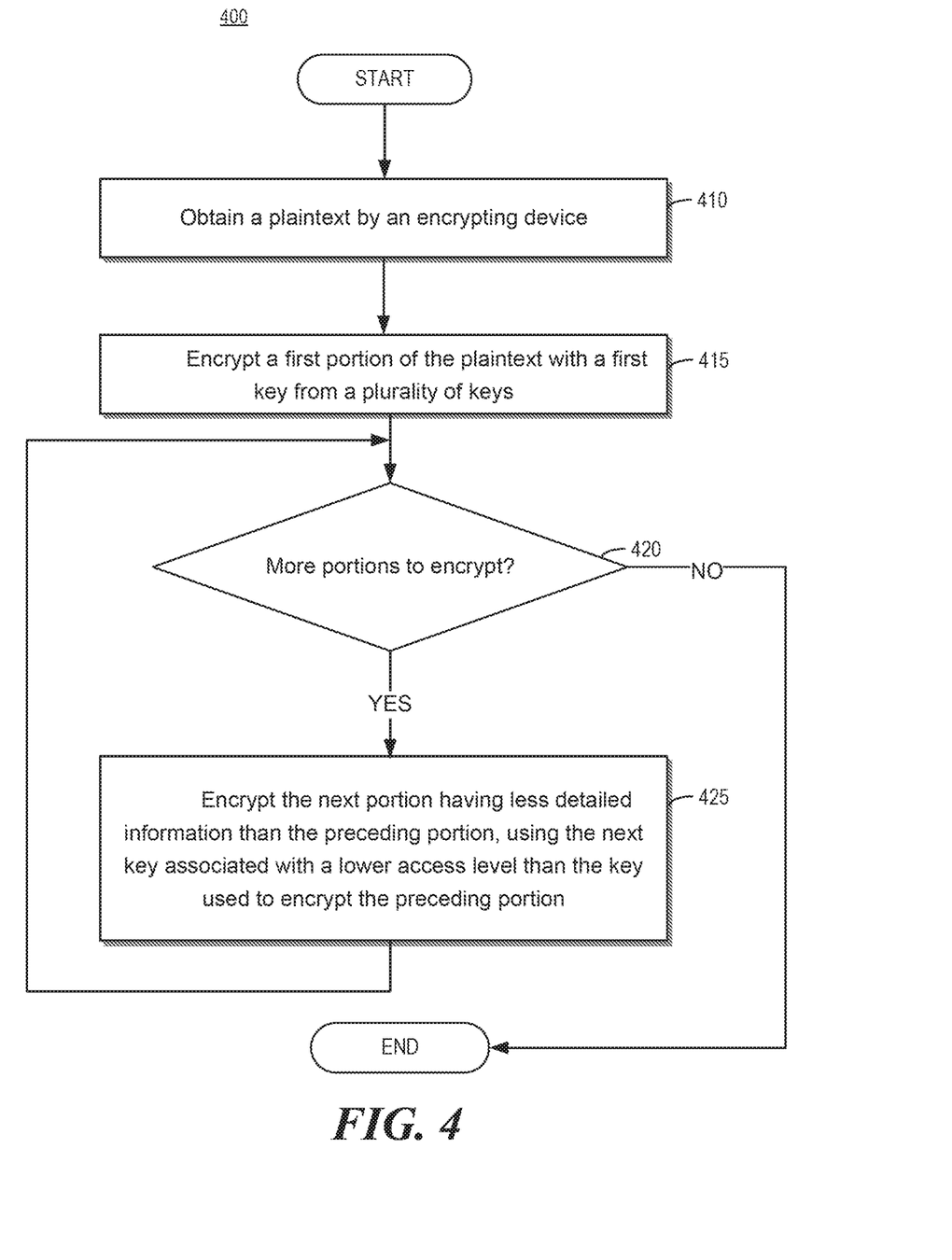
FIG. 4 shows an example method.

FIG. 4 is a flowchart of an example method 400. Method 400 may be described below as being executed or performed by a system or by an encrypting device such as encrypting device 110 of FIG. 1. Other suitable systems and/or encrypting devices may be used as well. Method 400 may be implemented in the form of executable instructions stored on at least one non-transitory machine-readable storage medium of the system and executed by at least one processor of the system. Method 400 may also be implemented in the form of electronic circuitry (e.g., hardware). In other examples of the present disclosure, any number of blocks of method 400 may be executed substantially concurrently or in a different order than shown in FIG. 4. In other examples of the present disclosure, method 400 may include more or less blocks than are shown in FIG. 4. In some examples, any blocks of method 400 may, at certain times, be ongoing and/or may repeat.

At block 410, method 400 may obtain a plaintext from an encrypting device, such as encrypting device 110 discussed above. At block 415, the method may encrypt a first portion of the plaintext with a first key from a plurality of keys, as discussed above. At block 420, the method may determine whether there are additional portions to encrypt, and if so, proceeds to block 425. At block 425, the method may encrypt the next portion having less detailed information than the preceding portion, using the next key associated with a lower access level than the key used to encrypt the preceding portion. The method may then proceed to block 420 again, until all portions to be encrypted have been encrypted.

In some examples, as discussed above, each encryption iteration of the method may include encrypting with the next key not only the next portion, but the result of the encryption performed at the preceding iteration. Furthermore, as discussed above, in some examples the plaintext may include a geographic coordinate, in which case each next portion may be associated with a lower resolution than the preceding portion. Furthermore, as discussed above, in some examples encrypting the plaintext may include leaving at least one portion of the plaintext unencrypted. Furthermore, as discussed above, in some examples, the encryption at each iteration may be a format-preserving encryption, in which case the resulting ciphertext may be associated with the same character domain as the plaintext, and have the same length as the plaintext.

Figure 5:
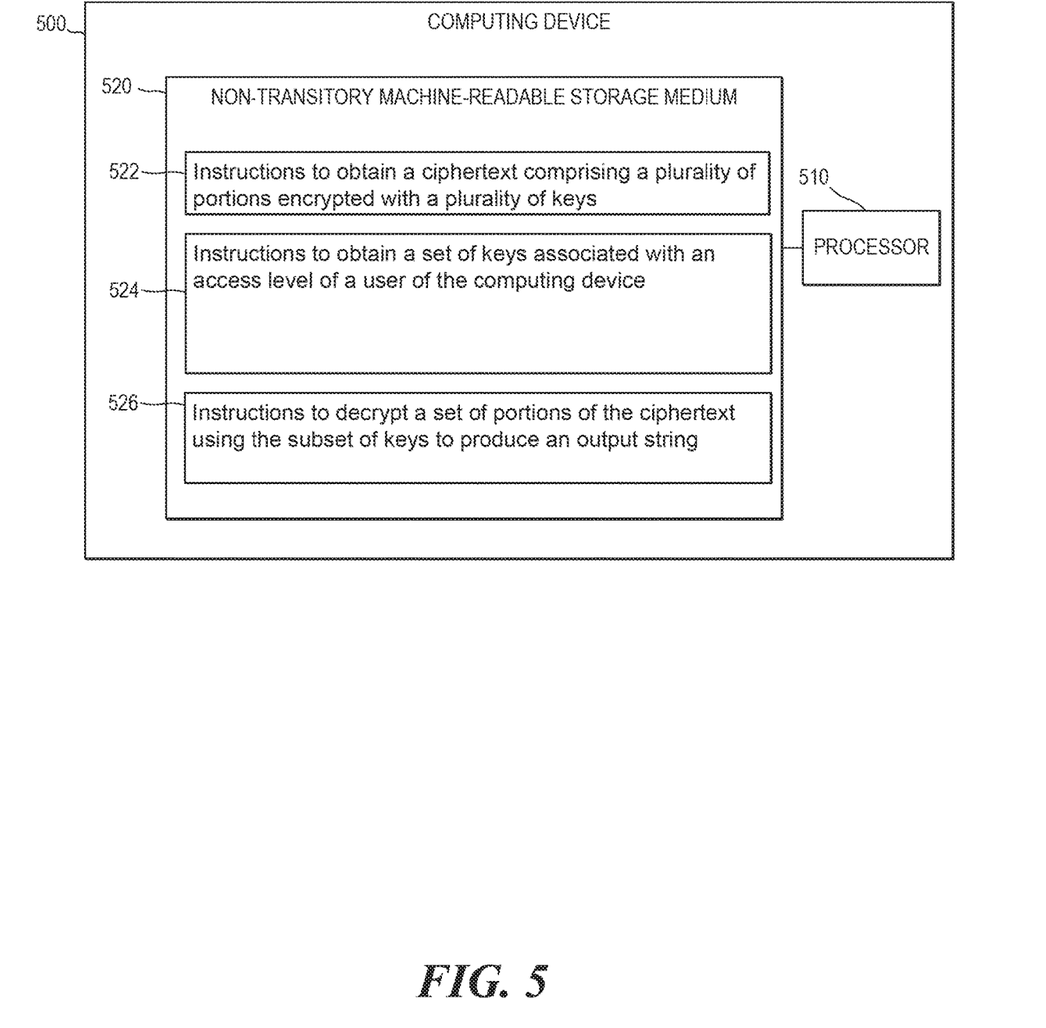
FIG. 5 is another block diagram of an example computing device.

FIG. 5 is a block diagram of an example computing device 500. Computing device 500 may be similar to or different from decrypting device 320A, 320B, or 320C shown in FIG. 3. In the example of FIG. 5, computing device 500 includes a processor 510 and a non-transitory machine-readable storage medium 520. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 510 include any number of central processing units (CPUs), microprocessors, and/or other hardware devices suitable for retrieval and execution of instructions stored in non-transitory machine-readable storage medium 520. In the particular example shown in FIG. 5, processor 510 may fetch, decode, and execute instructions 522, 524, 536, and any other instructions (not shown for brevity). Instead of or in addition to retrieving and executing instructions, processor 510 may include any number of electronic circuits comprising a number of electronic components for performing the functionality of any number of instructions in machine-readable storage medium 520. With respect to the executable instruction representations (e.g., boxes) described and shown herein, it should be understood that part or all of the executable instructions and/or electronic circuits included within one box may, in other examples, be included in a different box shown in the figures or in a different box not shown.

Non-transitory machine-readable storage medium 520 may be any electronic, magnetic, optical, or other physical storage device that stores executable instructions. Thus, medium 520 may be, for example, Random Access Memory (RAM), an Electrically-Erasable Programmable Read-Only Memory (EEPROM), a storage drive, an optical disc, and the like. Medium 520 may be disposed within encrypting device 500, as shown in FIG. 5. In this situation, the executable instructions may be "installed" on computing device 500. Medium 520 may be a portable, external or remote storage medium, for example, that allows computing device 500 to download the instructions from the portable/external/remote storage medium. In this situation, the executable instructions may be part of an "installation package". As described herein, medium 520 may be encoded with executable instructions.

Referring to FIG. 5, instructions 522, when executed by a processor (e.g., 510), may cause a computing device (e.g., 500) to obtain a ciphertext that includes a plurality of portions encrypted with a plurality of keys. Instructions 524, when executed by the processor, may cause the computing device to obtain a set of keys associated with an access level of a user of the computing device. As discussed above, in some examples the access level of the user may be one of a plurality of access levels, where the plurality of access levels may include at least a first access level associated with a first set of keys and a second access level associated with a second set of keys, where the first set of keys includes all of the plurality of keys, and the second set of keys does not include at least one of the plurality of keys that were used to encrypt the plurality of portions.

Instructions 526, when executed by the processor, may cause the computing device to decrypt a set of portions of the ciphertext using the subset of keys to produce an output string. As discussed above, in some examples the output string may have the same length as the ciphertext and may be associated with a same character domain as the ciphertext. Also, in some examples, the ciphertext may include an unencrypted portion, in which case that portion is not decrypted by the computing device. Also, in some examples, the encrypted portions may be decrypted in accordance with a predefined order, as discussed above.

The invention claimed is:

1. A method comprising:
obtaining plaintext by an encrypting device, wherein the plaintext comprises a plurality of portions arranged in an ordered sequence from a most significant portion of the plurality of portions to a least significant portion of the plurality of portions to collectively represent a value, the most significant portion represents less detail about the value than the portions of the plurality of portions other than the most significant portion, and the least significant portion represents more detail about the value than portions of the plurality of portions other than the least significant portion; and
encrypting the plaintext by the encrypting device using a plurality of iterations, wherein:
a first iteration of the plurality of iterations comprises encrypting a first portion of the plurality of portions with a first key from a plurality of keys,
each next iteration of the plurality of iterations comprises encrypting a next portion of the plurality of portions with a next key from the plurality of keys,
the next portion comprises less detailed information than a preceding portion encrypted in a previous iteration of the plurality of iterations, wherein the next key is associated with a first access level, and the first access level is relatively lower than a key of the plurality of keys used to encrypt the preceding portion.

2. The method of claim 1, wherein the next iteration further comprises encrypting, with the next key, a result of an encryption performed at the previous iteration.

3. The method of claim 1, wherein the value represents a geographic coordinate, and wherein the next portion is associated with a lower resolution than the preceding portion.

4. The method of claim 1, wherein the encrypting comprises leaving at least one portion of the plurality of portions unencrypted.

5. The method of claim 1, wherein the encrypting produces a ciphertext associated with a same character domain as the plaintext, and the ciphertext has a same length as the plaintext.

6. An encrypting device comprising:
a processor;
a memory to store instructions that, when executed by the processor, cause the processor to:
obtain plaintext, wherein the plaintext comprises a plurality of portions arranged in an ordered sequence from a most significant portion of the plurality of portions to a least significant portion of the plurality of portions to collectively represent a value, the most significant portion represents less detail about the value than the portions of the plurality of portions other than the most significant portion, and the least significant portion represents more detail about the value than portions of the plurality of portions other than the least significant portion; and
encrypt the plaintext by the encrypting device using a plurality of iterations, wherein:
a first iteration of the plurality of iterations comprises encrypting a first portion of the plurality of portions with a first key from a plurality of keys,
each next iteration of the plurality of iterations comprises encrypting a next portion of the plurality of portions with a next key from the plurality of keys, and
the next portion comprises less detailed information than a preceding portion encrypted in a previous iteration of the plurality of iterations, wherein the next key is associated with a first access level, and the first access level is relatively lower than a key of the plurality of keys used to encrypt the preceding portion.

7. The encrypting device of claim 6, wherein the instructions, when executed by the processor, further cause the processor to encrypt a second portion of the plurality of portions encompassing the first portion after the first portion is encrypted.

8. The encrypting device of claim 6, wherein the instructions, when executed by the processor, further cause the processor to obtain the plurality of keys from a key database.

9. The encrypting device of claim 6, wherein the value represents a geographic coordinate, and wherein the first portion comprises a set of least significant digits of the geographic coordinate.

10. The encrypting device of claim 6, wherein the instructions, when executed by the processor, further cause the processor to provide a ciphertext comprising the first portion encrypted with the first key, a second portion of the plurality of portions encrypted with a second key of the plurality of keys, and a third portion of the plurality of portions that is unencrypted or encrypted with a third key of the plurality of keys.

11. A non-transitory machine-readable storage medium encoded with instructions that, when executed by a processor of a computing device, cause the computing device to:
obtain a ciphertext corresponding to a plurality of portions encrypted with a plurality of keys, wherein the plurality of portions are arranged in an ordered sequence for a most significant portion of the plurality of portions to a least significant portion of the plurality of portions to collectively represent a value, the most significant portion represents less detail about the value than the portions of the plurality of portions of the most significant portion, and the least significant portion represents more detail about the value than portions of the plurality of portions other than the least significant portion;
obtain a subset of keys of the plurality of keys associated with an access level of a user of the computing device; and
decrypt at least part of the ciphertext using the subset of keys to produce an output string representing a lower resolution version of the value than a resolution of the value represented by the plurality of portions.

12. The non-transitory machine-readable storage medium of claim 11, wherein the output string has a same length as the ciphertext and is associated with a same character domain as the ciphertext.

13. The non-transitory machine-readable storage medium of claim 11, wherein the access level of the user is one of a plurality of access levels, the plurality of access levels comprising at least a first access level associated with a first set of keys and a second access level associated with a second set of keys, wherein the first set of keys comprises all keys of the plurality of keys, and the second set of keys does not comprise at least one key of the plurality of keys.

14. The non-transitory machine-readable storage medium of claim 11, wherein the instructions, when executed by the processor, further cause the processor to decrypt the at least part of the ciphertext according to the ordered sequence.

15. The non-transitory machine-readable storage medium of claim 11, wherein the ciphertext further comprises an unencrypted portion.

* * * * *